(12) United States Patent
    Rusten

(10) Patent No.: US 10,552,363 B2
(45) Date of Patent: Feb. 4, 2020

(54) DATA PROCESSING

(71) Applicant: Nordic Semiconductor ASA, Trondheim (NO)

(72) Inventor: Joar Olai Rusten, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 18 days.

(21) Appl. No.: 15/736,759

(22) PCT Filed: Jun. 16, 2016

(86) PCT No.: PCT/GB2016/051791
§ 371 (c)(1),
(2) Date: Dec. 14, 2017

(87) PCT Pub. No.: WO2016/203238
PCT Pub. Date: Dec. 22, 2016

(65) Prior Publication Data
US 2018/0173668 A1 Jun. 21, 2018

(30) Foreign Application Priority Data
Jun. 16, 2015 (GB) .................................. 1510552.1

(51) Int. Cl.
G06F 13/42 (2006.01)
G06F 13/40 (2006.01)
(Continued)

(52) U.S. Cl.
CPC ...... *G06F 13/4282* (2013.01); *G06F 9/30134* (2013.01); *G06F 9/544* (2013.01); *G06F 13/1673* (2013.01); *G06F 13/4059* (2013.01)

(58) Field of Classification Search
CPC ............. G06F 13/4282; G06F 13/4059; G06F 9/30134; G06F 9/544; G06F 13/1673
See application file for complete search history.

(56) References Cited

U.S. PATENT DOCUMENTS 3,696,338 A 10/1972 Preiss
3,828,326 A 8/1974 Cash
(Continued)

FOREIGN PATENT DOCUMENTS

EP 1 369 773 A2 11/1989
EP 1 237 090 A1 9/2002
(Continued)

OTHER PUBLICATIONS

International Search Report and Written Opinion for PCT/GB2016/051791, dated Aug. 29, 2016, 10 pages.
(Continued)

*Primary Examiner* — Henry Tsai
*Assistant Examiner* — Christopher Daley
(74) *Attorney, Agent, or Firm* — Klarquist Sparkman, LLP

(57) ABSTRACT

An electronic data processing device comprises: a processor (1); a serial interface comprising a connection for incoming data (16) and a connection for outgoing data (18); a hardware serial-interface controller (6) for controlling the serial interface; and a reception buffer (22) for receiving incoming data. The processor is arranged automatically to read data written to the reception buffer. The device is arranged so that the processor can indicate to the serial interface controller that it is unable to accept data. The controller is arranged to respond to incoming data by sending a rejection message from the outgoing serial connection and to prevent incoming data from being placed in the reception buffer.

19 Claims, 3 Drawing Sheets

(51) Int. Cl.
*G06F 9/30* (2018.01)
*G06F 9/54* (2006.01)
*G06F 13/16* (2006.01)

(56) References Cited

U.S. PATENT DOCUMENTS

| | | | |
|---|---|---|---|
| 4,291,196 A | 9/1981 | Spaniol et al. | |
| 4,546,430 A | 10/1985 | Moore et al. | |
| 5,339,394 A | 8/1994 | Johnson, Jr. et al. | |
| 5,535,341 A | 7/1996 | Shah et al. | |
| 5,694,619 A | 12/1997 | Konno | |
| 5,893,919 A * | 4/1999 | Sarkozy | G06F 11/1008 711/114 |
| 6,041,418 A * | 3/2000 | Chen | G06F 1/12 713/400 |
| 6,173,355 B1 | 1/2001 | Falik et al. | |
| 6,405,233 B1 * | 6/2002 | Mathews | G06F 5/01 708/670 |
| 6,823,416 B1 | 11/2004 | Dempsey et al. | |
| 7,664,902 B1 | 2/2010 | Chow et al. | |
| 7,685,328 B2 * | 3/2010 | Fruhauf | G06F 13/4068 710/11 |
| 2002/0133646 A1 * | 9/2002 | Cheung | G06F 13/385 710/22 |
| 2007/0061342 A1 * | 3/2007 | Magdeburger | G06F 13/385 |
| 2007/0192530 A1 | 8/2007 | Pedersen et al. | |
| 2007/0192565 A1 * | 8/2007 | Hoshino | G06F 15/7832 712/34 |
| 2007/0239890 A1 | 10/2007 | Chen et al. | |
| 2007/0252724 A1 * | 11/2007 | Donaghey | G06F 8/654 340/905 |
| 2009/0245446 A1 | 10/2009 | Hsieh et al. | |
| 2009/0276550 A1 | 11/2009 | Megarity | |
| 2009/0310489 A1 * | 12/2009 | Bennett | G06F 13/4278 370/236 |
| 2011/0289180 A1 * | 11/2011 | Sonnier | G06F 12/0831 709/213 |
| 2012/0036239 A1 * | 2/2012 | Donaghey | G06F 16/1847 709/221 |
| 2012/0278544 A1 | 11/2012 | Eleftheriou et al. | |
| 2013/0125127 A1 * | 5/2013 | Mital | G06F 9/46 718/102 |
| 2013/0244721 A1 * | 9/2013 | Furuta | H04W 88/06 455/552.1 |
| 2013/0275066 A1 * | 10/2013 | Spanier | G01R 21/133 702/61 |
| 2014/0047141 A1 | 2/2014 | Sedeghi et al. | |
| 2014/0281651 A1 * | 9/2014 | Mangalindan | G06F 1/12 713/400 |
| 2015/0074319 A1 * | 3/2015 | Spence | G06F 13/1642 710/310 |
| 2015/0351088 A1 * | 12/2015 | Gutman | H04W 72/048 370/336 |
| 2016/0062331 A1 * | 3/2016 | Von Wendorff | G05B 19/042 702/66 |
| 2016/0132440 A1 * | 5/2016 | Casady et al. | G06F 13/1673 710/308 |
| 2016/0232123 A1 * | 8/2016 | Soja | G06F 13/4243 |
| 2016/0246743 A1 * | 8/2016 | Hildebrand | G06F 13/4286 |
| 2017/0017584 A1 * | 1/2017 | Kilzer | G06F 13/102 |
| 2017/0126334 A1 * | 5/2017 | Brekke | H04B 10/80 |
| 2017/0185548 A1 * | 6/2017 | Sakuma | G06F 13/36 |

FOREIGN PATENT DOCUMENTS

| | | |
|---|---|---|
| JP | 64-64056 | 3/1989 |
| WO | WO 2007/095579 A2 | 8/2007 |

OTHER PUBLICATIONS

Search Report under Section 17(5) for GB1510552.1, dated Jan. 8, 2016, 4 pages.

* cited by examiner

DATA PROCESSING

CROSS REFERENCE TO RELATED APPLICATIONS

This is the U.S. National Stage of International Application No. PCT/GB2016/051791, filed Jun. 16,2016, which was published in English under PCT Article 21(2), which in turn claims the benefit of Great Britain Application No. 1510552.1, filed Jun. 16, 2015.

Many modern electronic systems, particularly embedded systems, require a means of communication to be provided in order to allow different devices to share data as required. Serial communications allow for transactions (i.e. a transfer of data from one device to another) that comprise sending and receiving one bit at a time over a communications channel.

There are a number of different serial communications protocols and specifications that are utilised in different contexts to meet different design parameters and constraints. One such protocol is the Serial Peripheral Interface (SPI) bus, a protocol first designed by Motorola that has become a de facto standard in the embedded systems industry. SPI provides serial, full duplex communications between a master device and one or more slave devices.

Electronic devices used for the processing of serial data are commonly implemented using a shift registers that clock in new data and clock out old data simultaneously with each clock cycle. It is important to extract all existing data and load all of the new data into the shift register prior to the start of any given transaction to prevent the transmission of corrupt data. In many such devices, the CPU is given the responsibility of ensuring this does not happen.

It is a common feature with serial communications protocols for all transactions to be initiated by a master device, and as the slave devices have no control over data flow, they are inevitably imposed with a finite time limit for reading all incoming data to the shift register before it is permanently lost. If the shift register is not updated in time before the master device initiates another transaction, the slave device will likely send corrupt data.

One possible solution is to use high priority interrupts in an attempt to prevent the master device initiating transactions at unsuitable times that will lead to data corruption. However, this solution is not always feasible when there are other high priority tasks within the embedded system CPU.

When viewed from a first aspect, the present invention provides an electronic data processing device comprising:
 a processor;
 a serial interface comprising a connection for incoming data and a connection for outgoing data;
 a hardware serial-interface controller for controlling the serial interface; and
 a reception buffer for receiving incoming data, wherein the processor is arranged automatically to read data written to the reception buffer;
 wherein the device is arranged so that the processor can indicate to the serial interface controller that it is unable to accept data, said controller being arranged then to respond to incoming data by sending a rejection message from the outgoing serial connection and to prevent incoming data from being placed in the reception buffer.

Thus it will be seen by those skilled in the art that in accordance with the invention the device can provide an indication to a further device transmitting data to it that it cannot accept the data, rather than the data being lost or corrupted.

In some protocols, each device may be considered "equal"; however, in other protocols a master-slave hierarchy may be in place. In some embodiments, the device is a slave device. In some embodiments, the slave device is arranged such that the rejection message is sent to a master device. This arrangement provides the slave device (which typically has no control over data flow) some control over incoming data. While the slave device might not be able to stop the master transmitting any additional data to it, it can at least provide an indication to the master that any additional data will be discarded. In turn, this allows the master device to re-transmit the data at a later time.

There are a number of different serial communications protocols in which the present invention has application. In some embodiments, the serial interface is a serial peripheral interface (SPI) bus. As described above, SPI is a de facto standard and is particularly suited to the data processing device described herein. In some embodiments, the device comprises an SPI slave.

Buffers can be implemented physically in hardware, using a fixed memory location on a storage device, or may be implemented virtually in software, utilising pointers to memory locations on a storage device. Buffers usually operate on a first in, first out (FIFO) basis, whereby the buffer outputs data in the order in which it was input. In some embodiments, the reception buffer comprises a shift register. Shift registers provide an effective way of implementing a FIFO buffer, wherein new data is clocked in and the oldest data is clocked out with every clock cycle. Those skilled in the art will understand the terms "clocked in" and "clocked out" to mean that the shift register receives a rising or falling edge (depending on configuration) and inputs or outputs data respectively, with all of the existing data "shifting" along within the register accordingly.

All buffers are limited (either by physical storage space or through software limitations) to a particular quantity of data they can store at any one time. In some embodiments, the device comprises a maximum reception limit. In some further embodiments, the device is arranged to generate an overflow event if an amount of received data exceeds said maximum reception limit. This allows the device to discard incoming data that caused the overflow event.

In some embodiments, the device comprises a reception counter. The reception counter allows the device to monitor the amount of data that was written to the reception buffer in the previous transaction. As the device may not have prior knowledge of the amount of data it is to receive, the reception counter may, for example, allow the CPU to keep track of how many bytes have been received.

As well as receiving data, the device may also be capable of transmitting data. Thus in some embodiments, the device comprises a transmission buffer for transmitting data. In some embodiments, the reception buffer and transmission buffer are different. Having separate buffers for the transmission and reception of data allows the device to perform both operations simultaneously.

As described above, there are limitations to the quantity of data that can be held in a buffer. In some embodiments, the device comprises a maximum transmission limit. In some further embodiments, the device is arranged to generate an overread event if the device is forced to transmit more data than said maximum transmission limit. In some embodiments, the device is arranged to send an overread character in such an event. This indicates that the device has been forced to transmit more data than it actually has in the buffer.

In some embodiments, the device comprises a transmission counter. The transmission counter allows the device to monitor the amount of data that was read from the transmission buffer in the previous transaction. As the device may not have prior knowledge of the amount of data it is to transmit, the transmission counter may, for example, allow the CPU to keep track of how many bytes have been read from the transmission buffer.

The rejection message can be used to warn other devices not to transmit any further data, or to re-transmit data that may have been lost or corrupted. In some embodiments, the device is further arranged so that the serial interface can generate a reception buffer full flag. This advantageously means that the processor is not required to monitor the serial interface actively while it is receiving data.

While the embodiments described hereinbefore refer to the device being provided with an incoming and an outgoing connection, in some embodiments the serial interface comprises a plurality of connections for incoming data. Additionally or alternatively the serial interface comprises a plurality of connections for outgoing data. This allows embodiments of the present invention to be used in multi-wire communication interfaces, such as Dual SPI and Quad SPI. These arrangements provide multiple parallel serial connections, such that more serial data can be sent in a given period of time, increasing the bitrate of the system.

Certain embodiments of the present invention will now be described, by way of example only, with reference to the accompanying drawings, in which:

FIG. 1 shows a block diagram of an electronic data processing device in accordance with an embodiment of the present invention. In this embodiment, the device comprises an SPI slave device 2, which is connected to random access memory (RAM) 4.

Figure 1:
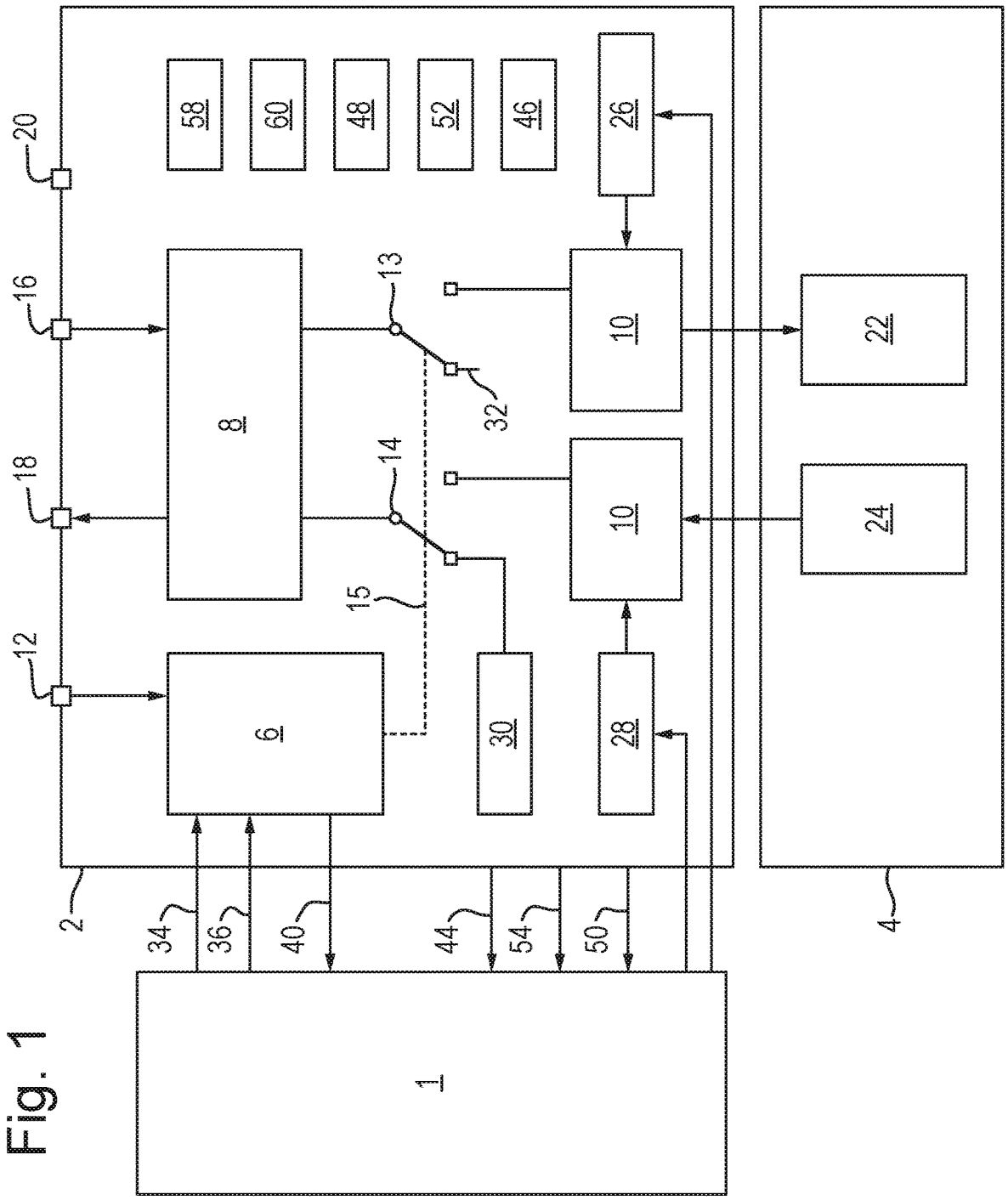
FIG. 1 shows a block diagram of an electronic data processing device in accordance with an embodiment of the present invention.

The SPI slave device 2 comprises a semaphore 6; transceiver 8; direct memory access (DMA) module 10; and two single pole double throw switches 13, 14 which may be physically implemented using a multiplexer. The device 2 also comprises a number of general purpose input/output (GPIO) pins, four of which are shown and are arranged as: chip select 12; master output slave input (MOSI)—or serial data in 16; master input slave output (MISO)—or serial data out 18; and serial clock 20.

The memory 4 contains a reception buffer 22 and a transmission buffer 24. The DMA module 10 is connected with direct access to the buffers 22, 24 and can address specific memory locations using a reception pointer 26 and transmission pointer 28 respectively.

The semaphore 6 is a hardware equivalent to a software semaphore and controls access to the buffers 22, 24 by toggling the state of the two switches 13, 14 via a control line 15. In one state, the switches 13, 14 connect the data in and data out pins 16, 18 to the DMA module 10, which in turn allows data to pass between the pins 16, 18 and the reception and transmission buffers 22, 24 respectively. In the other state, the switch 14 associated with the data out pin 18 is connected to a default character 30, while the switch 13 associated with the data in pin 16 is connected to a blank terminal 32.

The semaphore 6 takes as inputs, an acquire signal 34 and a release signal 36. Before the CPU 1 can safely update the reception and transmission pointers 26, 28 it must first 'acquire' the semaphore 6. The CPU can acquire the semaphore 6 by sending an 'acquire' signal 34 and waiting to receive an 'acquired' event 40. When the CPU has updated the reception and transmission pointers 26, 28, the CPU must 'release' the semaphore 6 (by sending the 'release' signal 36) before the SPI slave device 2 will be able to acquire it.

The maximum reception register 48 specifies the maximum number of bytes the SPI slave device 2 can receive in one granted transaction. If the SPI slave device 2 receives more than the maximum number of bytes that are allowed to be received (as defined by the maximum reception register 48), an overflow event 50 will be generated and the excess incoming bytes will be discarded.

The maximum transition register 52 specifies the maximum number of bytes the SPI slave device 2 can transmit in one granted transaction. If the SPI slave device 2 is forced to transmit more than the maximum number of bytes permitted (as defined by the maximum transition register 52), an overread event 54 will be generated and the overread character 56 will be clocked out.

The amount received and amount transmitted registers 58, 60 are updated when a granted transaction is completed. The amount transmitted register 60 indicates how many bytes were read from the transmission buffer 24 in the last transaction, i.e. overread characters 56 are not included in this number. Similarly the amount received register 58 indicates how many bytes were written into the reception buffer 22 in the last transaction.

Figure 2:
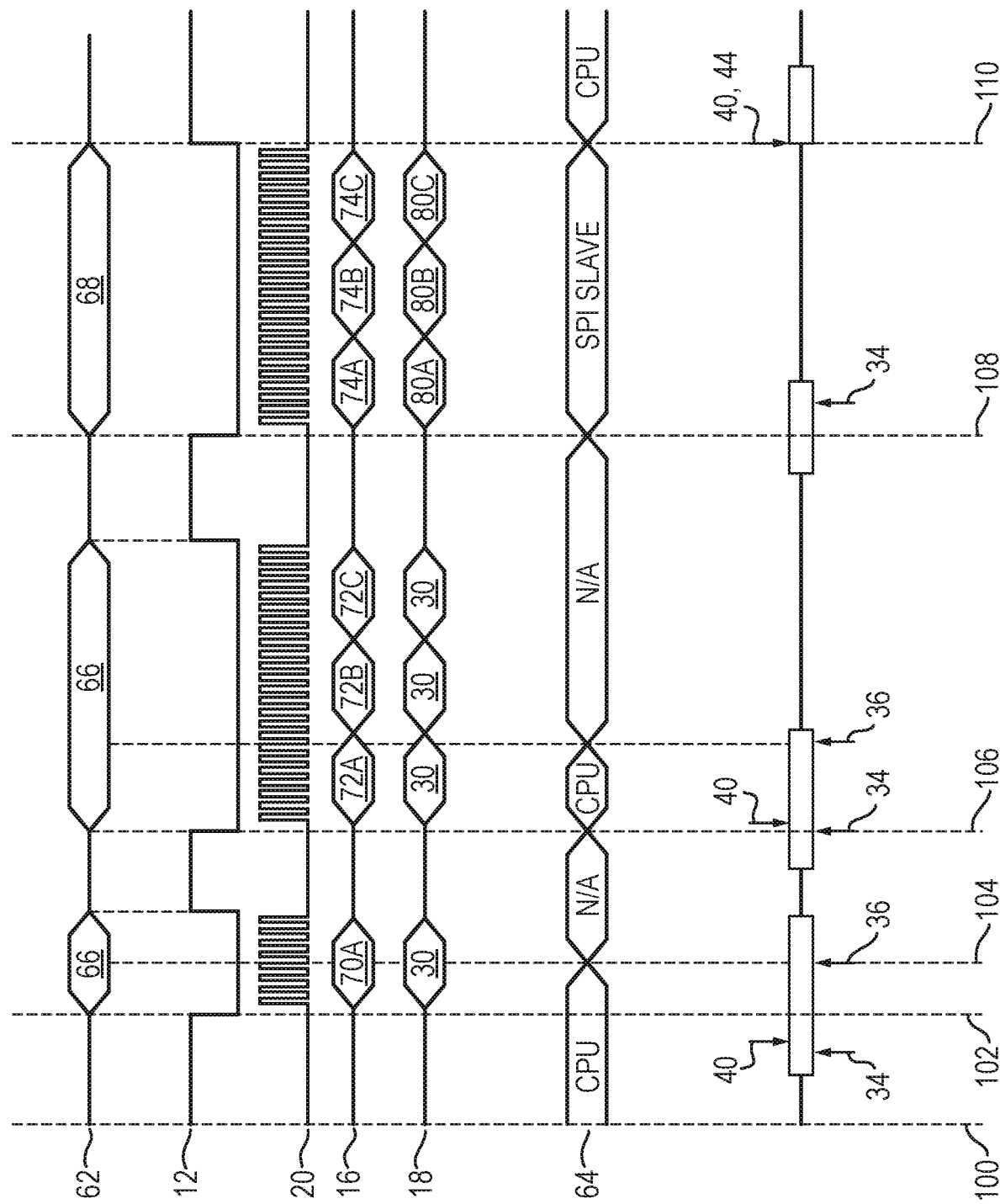
FIG. 2 shows a timing diagram of a set of typical transactions associated with the same embodiment as FIG. 1.

FIG. 2 shows a timing diagram of a set of typical transactions associated with the embodiment as FIG. 1. The timing diagram shows the transaction status 62 and semaphore status 64 as a function of time. In this instance, the end acquire shortcut 46 is enabled. The end acquire shortcut enables the CPU to acquire the semaphore from the SPI slave device instantaneously following an end event. The semaphore status 64 is labelled with the current entity to which the semaphore 6 is currently assigned: CPU, SPI slave, or unassigned (labelled "N/A").

At an initial time 100, the semaphore 6 is by default assigned to the CPU 1 after the SPI slave device 2 is enabled. No acquired event is generated for this initial semaphore handover.

At a subsequent time 102, the chip select pin 12 goes low which causes the SPI slave device 2 to attempt to acquire the semaphore 6, and enables the serial clock 12. As the semaphore 6 is already assigned to the CPU 1, the SPI slave device 2 does not manage to acquire the semaphore 6 at this point, and the transaction is ignored 66. All incoming data 70A on serial data in 16 is then discarded, and the default character 30 is clocked out via the serial data out 18 line for the duration of the transaction. The transaction continues to be ignored 66 even when the semaphore 6 is released by the CPU 1 during the attempted transaction at time 104 (i.e. the transaction must be granted at the initial time of request).

A race condition occurs at time 106, wherein the CPU 1 and the SPI slave device 2 both try to acquire the semaphore 6 simultaneously. In this case the default behaviour is to grant access to the semaphore 6 to the CPU 1. Again, the default character 30 is clocked out via serial out 18 and all incoming data 72A, 72B, 72C is discarded.

At time 108, the SPI slave device 2 manages to acquire the semaphore 6, and the transaction is granted 68. Accordingly, the incoming data 74A, 74B, 74C on serial data in 16 is stored in the reception buffer 22 and the data 80A, 80B, 80C within the transmission buffer 24 is clocked out on serial data out 18. When the granted transaction 68 is complete and chip select pin 12 goes high, the SPI slave device 2 automatically releases the semaphore 6 and generates an end event 44.

As long as the semaphore 6 is unassigned, the SPI slave device 2 can be granted multiple transactions one after the other. If the CPU 1 is not able to reconfigure the reception pointer 26 and transmission pointer 28 between granted transactions, the same transmission data will be clocked out and the reception buffer 22 will be overwritten. To prevent this from happening, the 'end acquire shortcut' 46 can be used. With this shortcut 46 enabled, the semaphore 6 will be handed over to the CPU 1 automatically once the current granted transaction is complete, providing the CPU 1 with the ability to update the reception and transmission pointers 26, 28.

If the CPU 1 tries to acquire the semaphore 6 while it is assigned to the SPI slave device 2, an immediate handover will be denied. However, in this scenario the semaphore 6 will be handed over to the CPU 1 as soon as the SPI slave device 2 has released the semaphore 6 following the completion of the current transaction. At time 110, since the 'end acquire shortcut' 46 is enabled and the CPU 1 has sent an acquire signal 34 during a transaction, the handover occurs immediately following the transaction.

Figure 3:
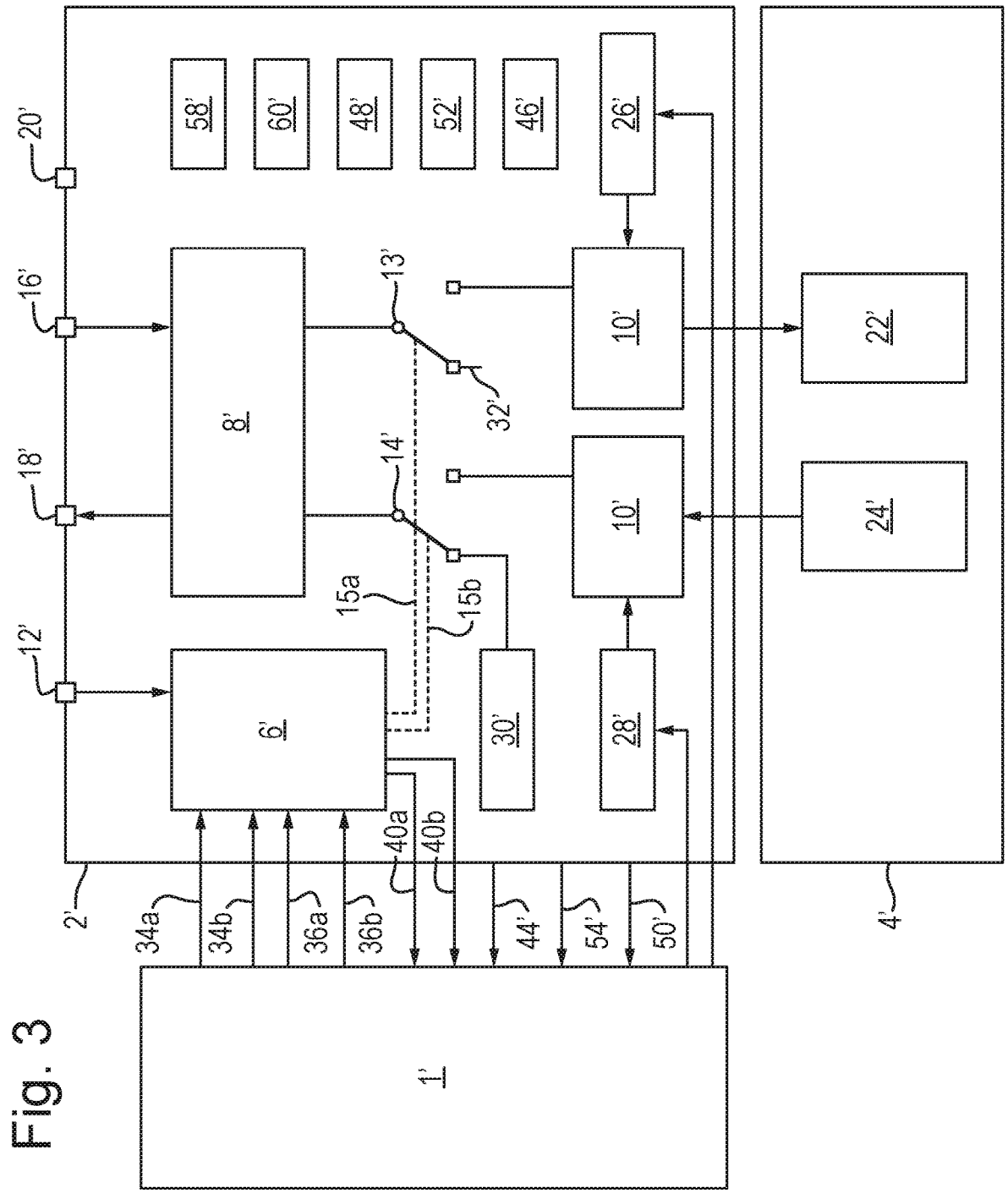
FIG. 3 shows a block diagram of an electronic data processing device in accordance with a further embodiment of the present invention.

FIG. 3 shows a block diagram of an electronic data processing device in accordance with a further embodiment of the present invention. This embodiment is very similar to that of FIG. 1 and differs only in that transmission and reception transactions can be controlled independently. Features in common with the previous embodiment are denoted by the same reference numerals with the addition of a prime symbol and will not be described again.

The semaphore 6' in this embodiment controls access to the buffers 22', 24' by toggling the state of the two switches 13', 14' via a receiver control line 15a and a transmitter control line 15b respectively.

The semaphore 6' takes as inputs an acquire receiver signal 34a, a release receiver signal 36a, an acquire transmitter signal 34b and a release transmitter signal 36b. If the CPU 1' wishes to receive, it can send an acquire receiver signal 34a and wait to receive a 'receiver acquired' event 40a. When the CPU has updated the reception pointer 26', the CPU 1' must 'release' the semaphore 6' (by sending the release receiver signal 36a) before the SPI slave device 2' will be able to acquire it for reception purposes.

Similarly, if the CPU 1' wishes to transmit, it can send an acquire transmitter signal 34b and wait to receive a 'transmitter acquired' event 40b. When the CPU has updated the transmission pointer 28', the CPU 1' must 'release' the semaphore 6' (by sending the release transmitter signal 36b) before the SPI slave device 2' will be able to acquire it for transmission purposes.

Thus it will be seen that an electronic data processing device that enables the sharing of data buffers while preventing data corruption has been described herein. Although particular embodiments have been described in detail, many variations and modifications are possible within the scope of the invention.

The invention claimed is:

1. An electronic data processing device-system comprising:
   a central processing unit;
   an electronic device comprising:
      a hardware semaphore which can be acquired by the central processing unit or the electronic device;
      a serial interface comprising a connection for incoming data and a connection for outgoing data; and
      a reception buffer for receiving incoming data, wherein the reception buffer is shared by the central processing unit and the electronic device;
   wherein the system is arranged such that when the central processing unit has acquired the hardware semaphore, said electronic device is arranged to respond to incoming data by sending a rejection message from the outgoing serial connection and to prevent incoming data from being placed in the reception buffer.

2. The system as claimed in claim 1, wherein the electronic device is a slave device.

3. The system as claimed in claim 2, wherein the slave device is arranged such that the rejection message is sent to a master device.

4. The system as claimed in claim 1, wherein the serial interface is a serial peripheral interface (SPI) bus.

5. The system as claimed in claim 4, wherein the electronic device comprises a serial peripheral interface (SPI) slave.

6. The system as claimed in claim 1, wherein the reception buffer comprises a shift register.

7. The system as claimed in claim 1, wherein the electronic device comprises a maximum reception register, wherein the maximum reception register determines a maximum reception limit.

8. The system as claimed in claim 7, wherein the electronic device is arranged to generate an overflow event if an amount of received data exceeds the maximum reception limit.

9. The system as claimed in claim 1, wherein the electronic device comprises a reception counter.

10. The system as claimed in claim 1, wherein the electronic device comprises a transmission buffer for transmitting data.

11. The system as claimed in claim 10, wherein the reception buffer and transmission buffer are different.

12. The system as claimed in claim 10, wherein the electronic device comprises a maximum transmission register, wherein the maximum transmission register determines a maximum transmission limit.

13. The system as claimed in claim 10, wherein the electronic device is arranged to generate an overread event if the electronic device is forced to transmit more data than the maximum transmission limit.

14. The system as claimed in claim 13, wherein the electronic device is arranged to send an overread character following an overread event.

15. The system as claimed in claim 10, wherein the electronic device comprises a transmission counter.

16. The system as claimed in claim 1, wherein the serial interface is arranged to generate a reception buffer full flag.

17. The system as claimed in claim 1, wherein the serial interface comprises a plurality of connections for incoming data.

18. The system as claimed in claim 1, wherein the serial interface comprises a plurality of connections for outgoing data.

19. The system as claimed in claim 1, wherein the electronic device is arranged to send the rejection message by clocking a default character out from the outgoing serial connection.

* * * * *